(12) United States Patent
Frank

(10) Patent No.: US 7,164,725 B2
(45) Date of Patent: Jan. 16, 2007

(54) METHOD AND APPARATUS FOR ANTENNA ARRAY BEAMFORMING

(75) Inventor: Colin D. Frank, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 858 days.

(21) Appl. No.: 09/801,892

(22) Filed: Mar. 8, 2001

(65) Prior Publication Data

US 2001/0038356 A1    Nov. 8, 2001

Related U.S. Application Data

(60) Provisional application No. 60/188,177, filed on Mar. 10, 2000.

(51) Int. Cl.
*H04B 7/02* (2006.01)
*H04B 17/00* (2006.01)
*H04B 7/24* (2006.01)

(52) U.S. Cl. ............... 375/267; 455/67.16; 370/338

(58) Field of Classification Search ............... 375/346, 375/267, 225, 385; 455/429, 500, 137, 12, 455/69; 370/338
See application file for complete search history.

(56) References Cited

U.S. PATENT DOCUMENTS

| | | | | |
|---|---|---|---|---|
| 5,754,139 A * | 5/1998 | Turcotte et al. | ............... | 342/373 |
| 5,767,807 A | 6/1998 | Pritchett | ............... | 342/374 |
| 5,960,350 A * | 9/1999 | Schorman et al. | ............... | 455/450 |
| 6,002,364 A | 12/1999 | Kroeger et al. | ............... | 342/359 |
| 6,175,588 B1 * | 1/2001 | Visotsky et al. | ............... | 375/148 |
| 6,304,750 B1 * | 10/2001 | Rashid-Farrokhi et al. | . | 455/137 |
| 6,314,147 B1 * | 11/2001 | Liang et al. | ............... | 375/346 |
| 6,351,499 B1 * | 2/2002 | Paulraj et al. | ............... | 375/267 |
| 6,404,821 B1 * | 6/2002 | Dent | ............... | 375/267 |
| 6,453,176 B1 * | 9/2002 | Lopes et al. | ............... | 455/562.1 |
| 6,556,809 B1 * | 4/2003 | Gross et al. | ............... | 455/12.1 |
| 6,697,619 B1 * | 2/2004 | Hogberg et al. | ............... | 455/429 |

FOREIGN PATENT DOCUMENTS

| | | |
|---|---|---|
| WO | WO 96/00466 | 1/1996 |
| WO | WO 97/21284 | 6/1997 |
| WO | WO 97/27643 | 7/1997 |
| WO | WO 99/23718 | 5/1999 |

OTHER PUBLICATIONS

U.S. Appl. No. 09/253,786, filed Feb. 22, 1999, Whinnett et al.

* cited by examiner

*Primary Examiner*—Mohammed Ghayour
*Assistant Examiner*—Cicely Ware
(74) *Attorney, Agent, or Firm*—Steven A. May

(57) ABSTRACT

An antenna array beamforming technique employs independent transmit weighting coefficients for multiple subscriber units served by a transmitting communication device. Optimization of the weighting coefficients is a joint, rather than an independent, venture of the multiple subscriber units. Joint optimization preferably is implemented at the transmitting communication device and involves the communication device optimizing based on knowledge of the channels between itself and each of the subscriber units, as well as knowledge of the inter-cell and intra-cell interference observed at each of the subscriber units. Joint optimization of the weighting coefficients is a complex process, and to simplify the process optimization criteria are defined that allow the weighting coefficients corresponding to the subscriber units to be optimized independendy rather than jointly. Because this technique accounts for self-interference, it yields a weighting that is more nearly optimal than the current methods of transmit antenna array weighting.

23 Claims, 5 Drawing Sheets

| $E_c/I_{or}$ | $(E_s/N_t)_{TxAA} - (E_s/N_t)_{STD}$ (dB) | | | |
|---|---|---|---|---|
| | $I_{or}/I_{oc}=0$ dB | $I_{or}/I_{oc}=5$ dB | $I_{or}/I_{oc}=10$ dB | $I_{or}/I_{oc}=\infty$ dB |
| 0.05 | 2.00 | 1.66 | 1.28 | 0.92 |
| 0.1 | 1.94 | 1.52 | 1.07 | 0.61 |
| 0.2 | 1.82 | 1.25 | 0.62 | −0.03 |
| 0.5 | 1.44 | 0.37 | −0.93 | −2.45 |
| 0.9 | 0.91 | −1.01 | −3.85 | −9.88 |

A COMPARISON OF THE PERFORMANCE OF TxAA ANTENNA ARRAY WEIGHTING AND STD AS A FUNCTION OF $I_{or}/I_{oc}$ AND $E_c/I_{or}$.

*FIG. 5*

| $E_c/I_{or}$ | $(E_s/N_t)_{OPTIMAL} - (E_s/N_t)_{TxAA}$ (dB) | | | |
|---|---|---|---|---|
| | $I_{or}/I_{oc}=0$ dB | $I_{or}/I_{oc}=5$ dB | $I_{or}/I_{oc}=10$ dB | $I_{or}/I_{oc}=\infty$ dB |
| 0.05 | 0.02 | 0.09 | 0.21 | 0.36 |
| 0.1 | 0.03 | 0.13 | 0.29 | 0.51 |
| 0.2 | 0.05 | 0.22 | 0.51 | 0.90 |
| 0.5 | 0.14 | 0.65 | 1.55 | 2.84 |
| 0.9 | 0.36 | 1.62 | 4.03 | 9.89 |

A COMPARISON OF THE PERFORMANCE OF OPTIMIZED TRANSMITTER ANTENNA ARRAY WEIGHTING OF THE PRESENT INVENTION (OPTIMAL) WITH THE TxAA TRANSMITTER ANTENNA ARRAY WEIGHTING OF THE PRIOR ART AS A FUNCTION OF $I_{or}/I_{oc}$ AND $E_c/I_{or}$.

*FIG. 6*

METHOD AND APPARATUS FOR ANTENNA ARRAY BEAMFORMING

REFERENCE(S) TO RELATED APPLICATION(S)

The present application claims priority from provisional application Ser. No. 60/188,177, entitled "Optimal Transmit Array Weighting for DS-CDMA with Channel Feedback," filed Mar. 10, 2000, which is commonly owned and incorporated herein by reference in its entirety."

FIELD OF THE INVENTION

The present invention relates to wireless telecommunication systems, and more particularly to the use of antenna arrays in wireless telecommunication systems.

BACKGROUND OF THE INVENTION

An important goal in designing a wireless communication system is to maximize system capacity, that is, to maximize a number of users that may simultaneously be served by the communication system. One way of increasing system capacity is to lower the transmit power allocated to each user. By lowering the allocated transmit power, interference for all users is lowered, which allows for the addition of new users to the system.

One way to lower the transmit power allocated to each user, or subscriber unit, is to increase the efficiency of the wireless link, or communication channel, between the subscriber unit and the base station serving that user. One method of increasing the efficiency of the link is to broadcast information to a target subscriber unit using a transmit antenna diversity system. A transmit antenna diversity system allows the transmitted signal to be beamformed so that a narrower, more focused beam is transmitted to the user. Antenna beamforming allows for a base station to lower the transmit power allocated to the signal, since the allocated power is less widely dispersed. Antenna beamforming also reduces multipath fading of the transmitted signal and interference with non-targeted users since the beam is more narrowly focused.

One method of antenna beamforming involves two-antenna diversity. Two-antenna diversity uses an antenna array consisting of two antennas, or array elements, to transmit a signal and then applies an optimization technique to improve the quality of the transmitted signal over the performance that would be afforded by the use of a single antenna. One of the simplest forms of two-antenna diversity is two-antenna selection transmit diversity (STD). As its name implies, this method involves selecting one of two antennas as the antenna that will be utilized as the transmitter for a particular communication. A typical method of selecting an antenna involves choosing the antenna that has the highest received power with respect to training, synchronization, or data communications exchanged with the target subscriber unit.

Another method of antenna beamforming involves separately weighting the signal transmitted by each element of the antenna array. If the elements of the antenna array are weighted and phased appropriately, the signals broadcast from these elements will add constructively at a receiver of the target subscriber unit. However, two conditions must be met before an optimal weighting can be applied to the transmit array. First, the channel between each of the array elements and the subscriber of interest must be known. Secondly, it must be possible to compute the signal-to-noise ratio of the subscriber unit of interest.

Previous work has been performed on optimizing the weightings determined at an antenna array for each of multiple subscribers units. Current methods for weighting the coefficients (hereinafter referred to as "TxAA") are optimal only if the interference environment of the target subscriber unit is dominated by inter-cell interference (optimal in the sense of maximizing the signal-to-noise ratio at the subscriber unit for a given level of transmit power). However, in many applications, especially data applications, the target subscriber unit is close to the base station, where self-interference is the dominant source of interference. In these conditions, the existing method for optimizing the transmitter weighting coefficients can be highly non-optimal.

In addition, current methods for weighting the coefficients do not account for the self-interference introduced by multipath delay. In fact, the current method is optimal only if one of the following two conditions hold; (i) the propagation channel has only a single path, or (ii) the ratio of intra-cell interference power to inter-cell interference power is zero. The latter condition can never be met precisely, but may be an acceptable approximation in some circumstances. In the absence of conditions (i) or (ii), situations arise where the current methods for weighting the coefficients perform worse than a much simpler selection transmit diversity (STD) weighting system.

As a result, current methods for weighting the coefficients are less than optimal for many operating environments. Therefore, an antenna array beamfoming technique is needed that optimizes performance of an antenna array in a high multipath fading environment or in environments of significant self-interference or where intra-cell interference dominates inter-cell interference.

BRIEF DESCRIPTION OF THE DRAWINGS

FIG. 5 is a table comparing the signal-to-noise ratio at the output of a matched-filter receiver for a signal transmitted by an antenna array employing the current coefficient weighting system and employing a selection transmit diversity system.

FIG. 6 is a table comparing the output of the matched-filter receiver for a signal received from a transmitting communication device employing the current coefficient weighting system and for a transmitting communication device employing optimized transmitting antenna array weighting determined in accordance with an embodiment of the present invention.

DETAILED DESCRIPTION OF THE INVENTION

Figure 1:
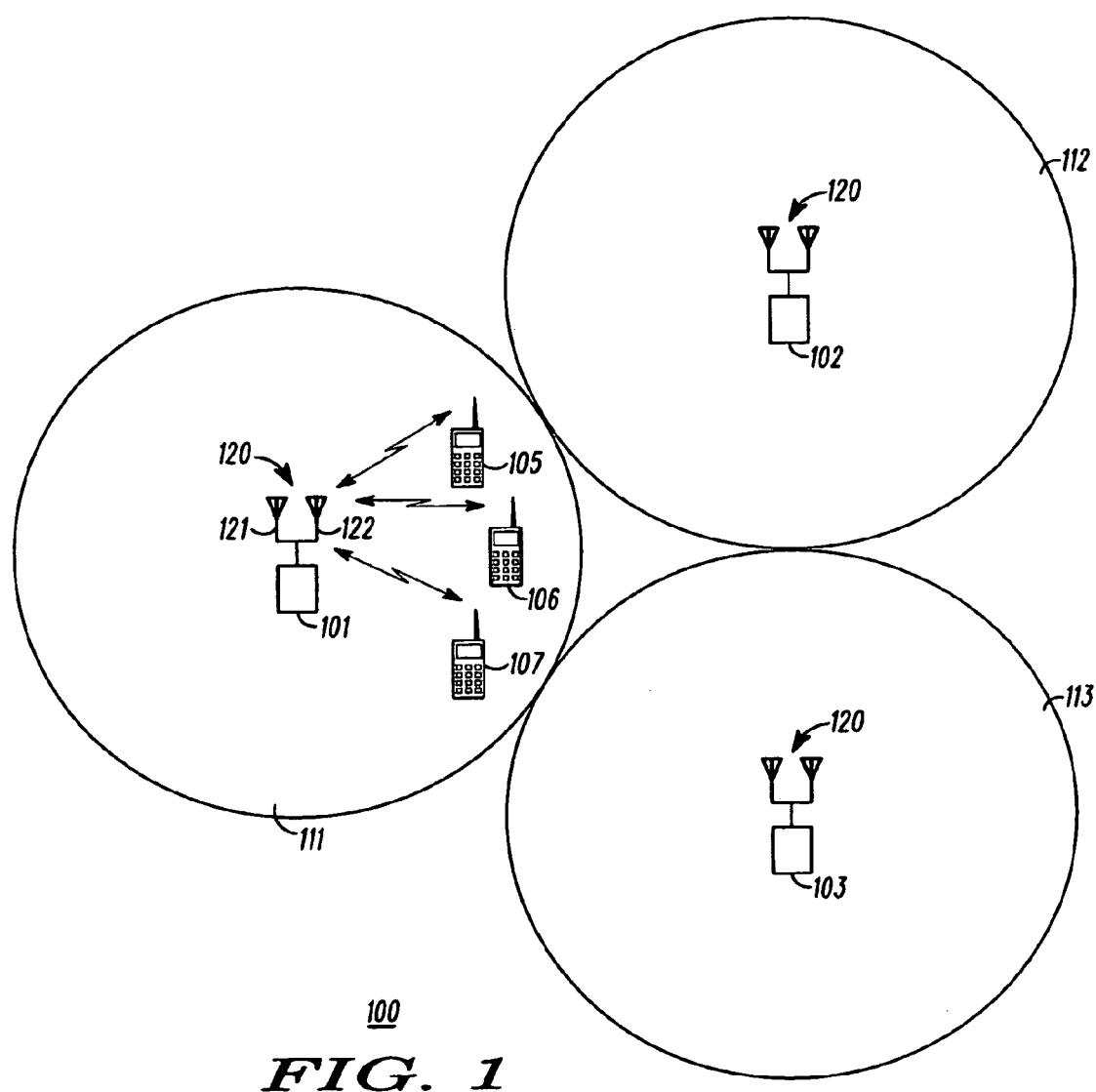
FIG. 1 is a block diagram of a communication system in accordance with an embodiment of the present invention.

In order to optimize performance of an antenna array in a high multipath fading environment or in environments of significant self-interference or where intra-cell interference dominates inter-cell interference, an antenna array beamforming technique employs independent transmit weighting coefficients for multiple subscriber units served by a transmitting communication device. Optimization of the weighting coefficients is a joint, rather than an independent, venture of the multiple subscriber units. Joint optimization preferably is implemented at the transmitting communication device and involves the communication device optimizing based on knowledge of the channels between itself and each of the subscriber units, as well knowledge of the inter-cell and intra-cell interference observed at each of the subscriber units. Joint optimization of the weighting coefficients is a complex process, and to simplify the process optimization criteria are defined that allow the weighting coefficients corresponding to the subscriber units to be optimized independently rather than jointly. Because this technique accounts for self-interference, it yields a weighting that is more nearly optimal than the current methods of transmit antenna array weighting The present invention may be more fully described with reference to FIGS. 1–6. FIG. 1 is a block diagram of a wireless communication system 100 in accordance with an embodiment of the present invention. Preferably communication system 100 is a code division multiple access (CDMA) communication system that includes multiple ("K") orthogonal communication channels, although those who are of ordinary skill in the art realize that that the present invention may be utilized in any wireless communication system, such as a time division multiple access (TDMA) communication system or an orthogonal frequency division multiplexing (OFDM) communication system. Preferably, each communication channel comprises one of multiple orthogonal spreading codes, such as Pseudo-noise (PN) sequences such as Walsh codes. The use of spreading codes permits the coexistence of multiple communication channels in the same frequency bandwidth.

Communication system 100 includes multiple geographically-diverse base stations 101–103 (three shown). Each base station 101–103 provides communication service to a respective service coverage area, or cell, 111–113. Each base station 101–103 preferably includes at least one antenna array 120 having multiple array elements 121, 122 (two shown). Communication system 100 further includes multiple subscriber units 105–107 (three shown), such as a cellular telephone, a radiotelephone, or a wireless modem. Each subscriber unit 105–107 includes a matched filter Rake receiver having multiple Rake fingers. Matched filter Rake receivers are well known in the art and will not be described in greater detail herein. A serving base station (e.g., base station 101) manages and provides radio communication services for each subscriber unit 105–107 while the subscriber unit is located in the serving base station's cell (i.e., cell 111).

In another embodiment of the present invention, a "sectorized" embodiment, each cell 111–113 may be subdivided into multiple sectors. In the sectorized embodiment, each base station 101–103 includes multiple antenna arrays that each includes multiple array elements. At least one antenna array of the multiple antenna arrays of each base station 101–103 is dedicated to each sector of the multiple sectors of each corresponding cell.

Figure 2:
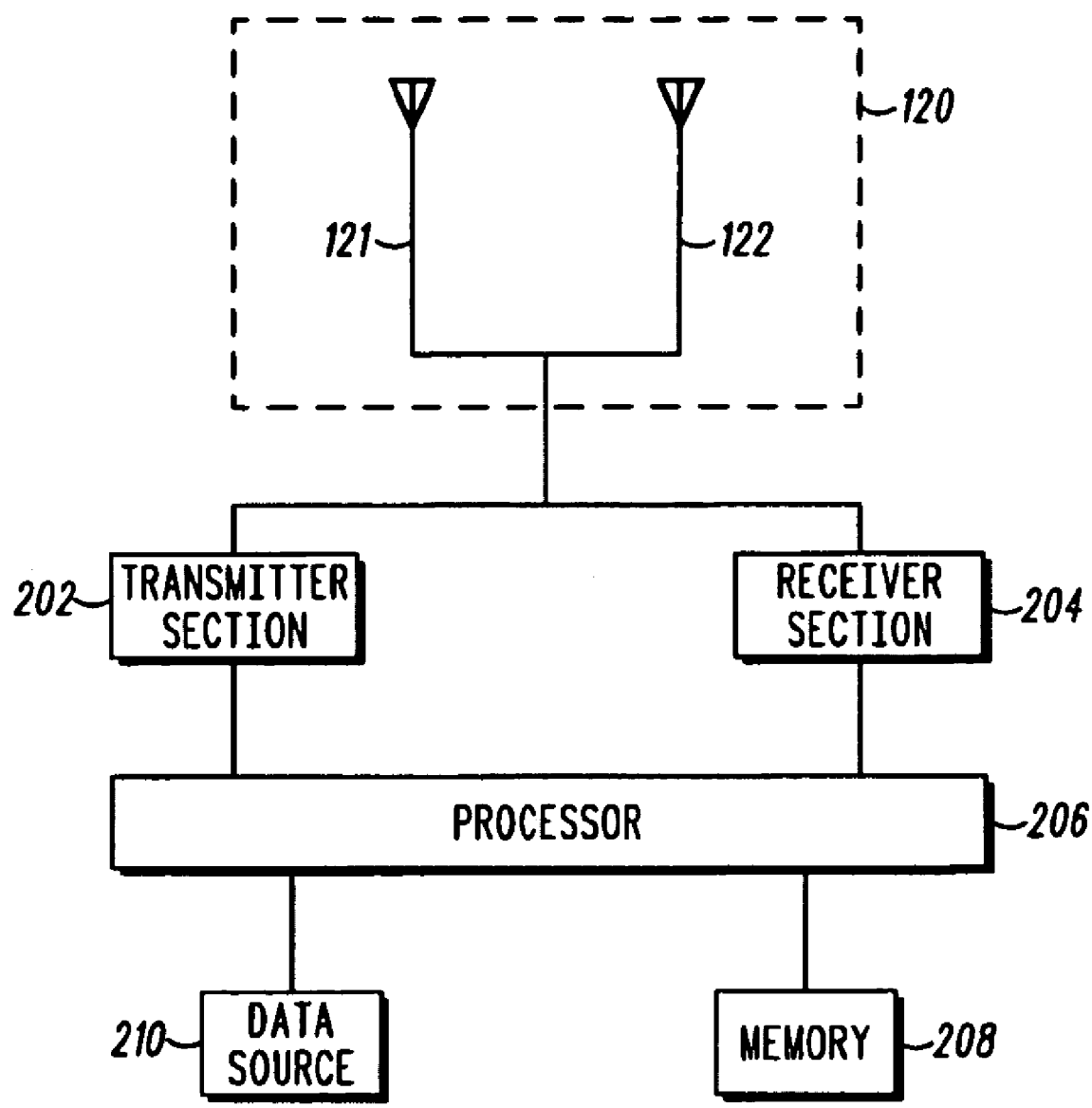
FIG. 2 is a block diagram of a transmitting communication device in accordance with an embodiment of the present invention.

FIG. 2 is a block diagram of a base station 101–103 in accordance with an embodiment of the present invention. As described above, each base station 101–103 preferably includes at least one antenna array 120 and associated array elements 121, 122. The antenna array 120 is coupled to a transmitter section 202 and a receiver section 204 that are, in turn, each coupled to a processor 206, such as a microprocessor or a digital signal processor (DSP). Processor 206 and an associated memory 208 allow the base station to store information, make computations, and run software programs.

Figure 3:
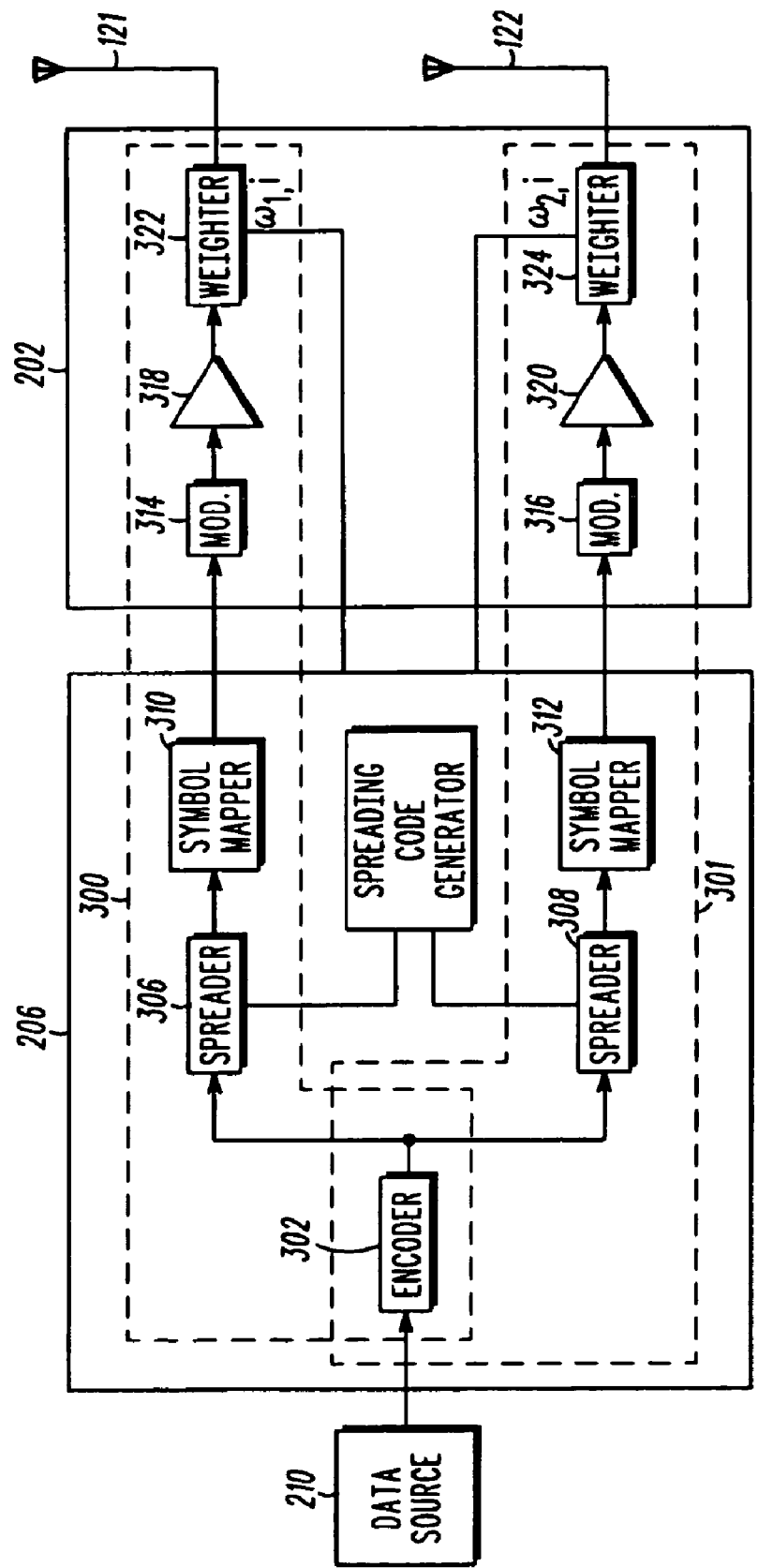
FIG. 3 is a block diagram of multiple transmitted signal paths of a transmitting communication device in accordance with an embodiment of the present invention.

FIG. 3 is a block diagram of multiple transmitted signal paths 300, 301 of a base station 101–103 in accordance with an embodiment of the present invention. Each transmitted signal path 300, 301 corresponds to one of the multiple array elements 121, 122 of an antenna array 120 of the base station. Data is sourced to the base station by a data source 210, such as an interface with an external network, such as a public switched telephone network (PSTN) or the Internet, or an application running on processor 206 of the base station.

Data source 210 is coupled to processor 206. As depicted in FIG. 3, processor 206 includes an encoder 302, multiple spreaders 306, 308, and multiple symbol mappers 310, 312. Encoder 302 receives data from data source 210 and encodes the data utilizing a predetermined coding scheme, such as a block coding scheme or a convolutional coding scheme. Encoder 302 then conveys the encoded data to each of multiple spreaders 306, 308. In another embodiment of the present invention, processor 206 may furtherer include an interleaver that interleaves the encoded data prior to the encoded data being conveyed to multiple spreaders 306, 308.

Each spreader of the multiple spreaders 306, 308 is coupled to a spreading code generator 304 and spreads the encoded data pursuant to a spreading code, preferably a pseudo-noise (PN) sequence such as a Walsh code, provided by the spreading code generator. Each spreader 306, 308 then conveys the spread data to a respective symbol mapper of the multiple symbol mappers 310, 312. Each symbol mapper 310, 312 maps the data to one of multiple symbols included in a constellation of symbols to produce a symbol stream corresponding to the modulated data. In one embodiment of the present invention, symbol mappers 310, 312 utilize a quadrature amplitude modulation (QAM) mapping scheme for mapping the data. However, the mapping scheme used is not critical to the present invention and those who are of ordinary skill in the art realize that a wide variety of mapping schemes, such a binary phase shift keying (BPSK) or quadrature phase shift keying (QPSK), may be used herein without departing from the spirit and scope of the present invention.

In a QAM mapping scheme, each symbol mapper 310, 312 groups the spread data into groups of P binary data units, such as data bits, to form multiple P-tuples. Each symbol mapper 310, 312 then modulates each of the multiple P-tuples by mapping the P-tuple to a corresponding point out of M possible points, wherein $M=2^P$, in a predetermined QAM constellation. To this end, the predetermined QAM constellation that includes the M possible points is defined within a multi-dimensional space, preferably a complex two-dimensional (I/Q) space. Each point within the two-dimensional space may be thought of as a vector sum of two scaled basis vectors. The two scaled basis vectors respectively correspond to an in-phase (I) component and a quadrature (Q) component of the constellation point, or corresponding data symbol. The respective amplitudes of the two basis vectors used to define a particular point may be thought of as two-dimensional coordinates of the point. After modulation of each P-tuple by a symbol mapper 310, 312, the modulated data is conveyed by processor 206 to transmitter section 202 for transmission.

Transmitter section 202 includes multiple modulators 314, 316 that are each coupled to one of multiple amplifiers 318, 320. Transmitter section 202 further includes multiple weighters 322, 324 that are each coupled between one of the multiple amplifiers 318, 320 and one of the multiple antennas 121, 122 and are further coupled to processor 206. Each modulator of the multiple modulators 314, 316 receives modulated data from a respective symbols mapper 310, 312 and modulates the modulated data onto a radio frequency (RF) carrier. Each modulated carrier is then conveyed to an amplifier coupled to the respective modulator 314, 316 that amplifies the modulated carrier produce an amplified signal and conveys the amplified signal to a respective weighter 322, 324. Each weighter 322, 324 modulates the amplified signal based on a weighting coefficient provided to the weighter by processor 206 and transmits the weighted signal via a respective antenna 121, 122. In other embodiments of the present invention, each weighter 322, 324 may be interposed between a modulator 314, 316 and an amplifier 318, 320, or may precede modulators 314, 316 and be located in processor 206.

In order to optimize the strength of an RF signal received by a target subscriber unit (i.e., subscriber unit 105) from the target units serving base station (i.e., base station 101), and to minimize the interference of the RF signal with communications between the serving base station and other active subscriber units (e.g., subscribers unit 106, 107) in the cell 111 corresponding to the serving base station, base station 101 employs an antenna array beamforming technique for the broadcast of the RF signal. The antenna array beamforming technique allows base station 101 to broadcast a narrowly focused signal to target subscriber unit 105 based on weighting coefficients assigned by the base station to each element 121, 122 of the base stations antenna array 120.

In one embodiment of the present invention, a "joint optimization" embodiment, weighting coefficients applicable to each of the multiple subscriber units 105–107 serviced by base station 101, and respectively applied to a transmission to each of the subscriber units, are jointly optimized. Preferably, the joint optimization of the weighting coefficients is performed by, and implemented at, serving base station 101, and is preferably preformed by processor 206 of the base station. In the joint optimization embodiment, the weighting coefficients are optimized jointly at serving base station 101.

Figure 4:
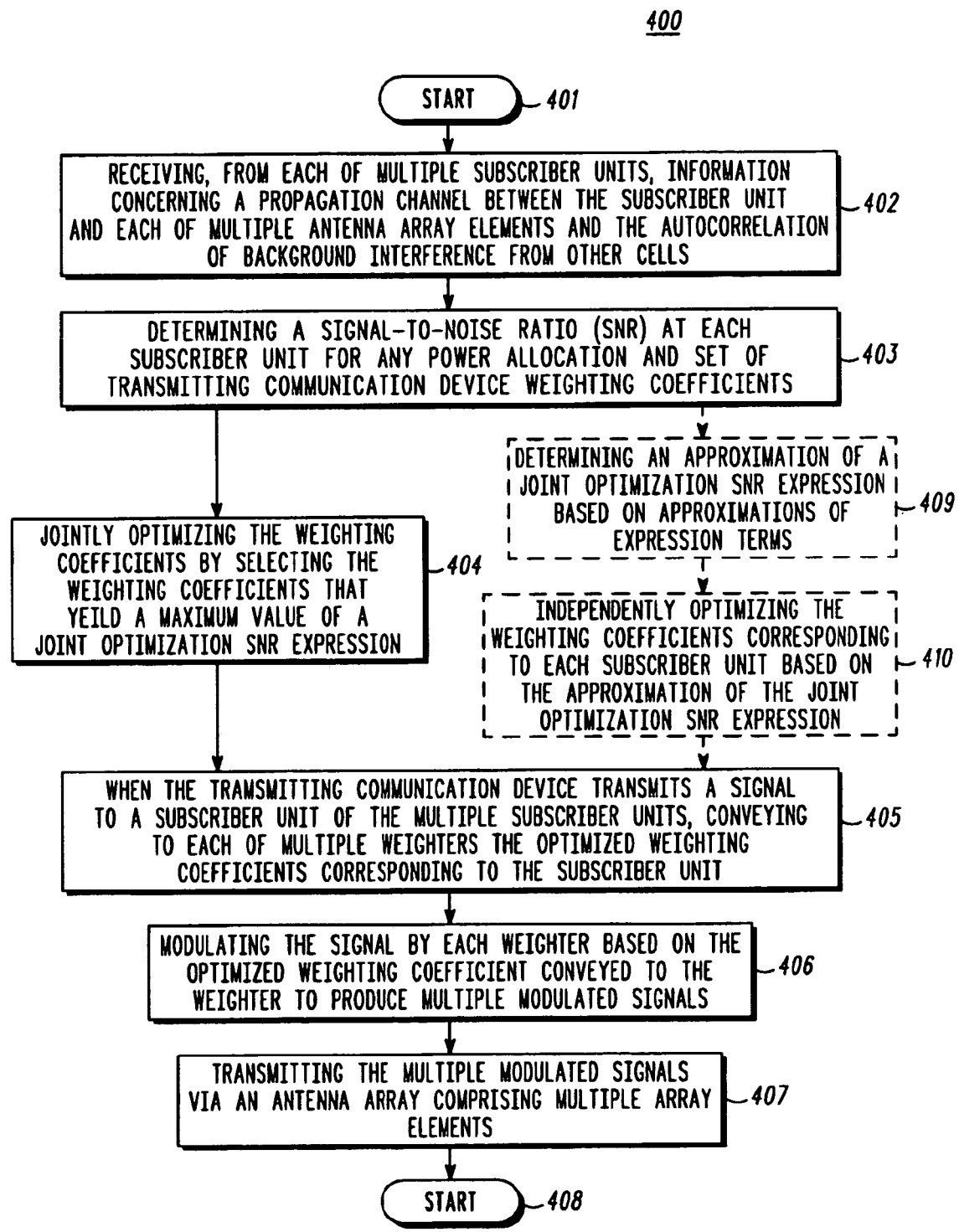
FIG. 4 is a logic flow diagram of antenna beamforming steps executed by a transmitting communication device in accordance with an embodiment of the present invention.

FIG. 4 is a logic flow diagram 400 of antenna beamforming steps executed by a transmitting communication device, such as base station 101, in accordance with an embodiment of the present invention. The logic flow begins (401) when each of multiple receiving communication devices, that is, subscriber units 105–107, transmits information to, and the transmitting communication device, that is, base station 101, receives (402) from each subscriber unit, information concerning a propagation channel between the subscriber unit and each of the antenna elements 121, 122 and the autocorrelation of background interference from AWGN and from cells other than the cell serviced by serving base station 101, that is, from cells 112 and 113. Alternatively, when each cell includes multiple sectors, the background interference may include interference from sectors in cell 111 other than the sector in which the subscriber unit is located.

A subscriber unit 105–107 measures the propagation channel between the subscriber unit and an array element 121, 122 by correlating a signal received from the element with a known version of the signal. For example, base station 101 may transmit, via the element, a pilot code, such as a predetermined pilot Walsh code, or a sequence of pilot symbols that is known to the subscriber unit and that is assigned to the element. When the subscriber unit receives the transmitted signal, the subscriber unit correlates the received signal with the known pilot code or symbols. Based on the comparison, the subscriber unit then determines the signal distortion attributable to the channel.

Measuring the autocorrelation of the background interference is somewhat more difficult. In one embodiment of the present invention, a subscriber unit 105–107 measures the autocorrelation of the background interference by demodulating a signal received from base station 101 (all channels) and subtracting the demodulated signal from an arriving signal. The resulting signal consists only of background interference, and the autocorrelation of this signal can be readily obtained by correlating the signal against itself. In another embodiment of the present invention, the subscriber unit may measure the autocorrelation by base station 101 periodically blanking its transmitted signal for short intervals of time. During the brief intervals in which the transmitted signal is turned off, the received signal consists only of background interference. Again, the interference autocorrelation can be measured by correlating the signal against itself.

In yet another embodiment of the present invention, a subscriber unit 105–107 may measure the autocorrelation of the background interference by measuring the correlation of a received signal that is transmitted by base station 101 (by correlating the signal against itself). This correlation is the sum of the signal correlation function and the interference correlation function. The subscriber unit transmits both the channel propagation information and the received signal correlation function to base station 101. Base station 101 computes the signal correlation for the transmitted signal, as observed at the subscriber, based on knowledge of both the propagation channel and the transmitted signal (e.g., a pilot signal). The interference correlation is then obtained by subtracting the computed correlation for the transmitted signal from the correlation function of the received signal.

With knowledge of the propagation channels between each of the multiple array elements 121, 122 and each of the multiple subscriber units 105–107 and the interference environment at each subscriber unit, base station 101, preferably processor 206 of the base station, determines (403) the signal-to-noise ratio (SNR) at each subscriber unit for any power allocation and set of base station weighting coefficients as described in greater detail below. Base station 101 jointly optimizes (404) the weighting coefficients by selecting the weighting coefficients that yield a maximum value of a joint optimization SNR expression, as described in greater detail below. When base station 101 then transmits a signal to a subscriber unit serviced by the base station, processor 206 conveys (405) the appropriate weighting coefficients to weighters 322, 324 of base station 101. Each wieghter 322, 324 then uses the weighting coefficient conveyed to the weighter by processor 206 to modulate (406) the signal being transmitted over the corresponding antenna array element 121, 122, which signal is then transmitted (407) via the corresponding array element, and the logic flow ends (408).

Preferably, base station 101 knows the loading of its corresponding cell 111 (i.e., the number of subscribers in the cell), or alternatively of the sector where target subscriber unit 105 is located. For example, assume that the data rate requirements for each of subscriber unit 105–107 are known, as are the data encoding and decoding schemes. With this information, the SNR requirements for each of subscriber units 105–107 are known. In this case, base station 101 first determines whether a feasible solution exists to the joint optimization of the optimal antenna array 120 weighting coefficients. In other words, base station 101 first determines whether any power and weighting allocation will meet the SNR requirements of all subscribers. When a feasible solution does exist, base station 101 can choose the solution that minimizes the total power transmitted by the base station. This will in some sense minimize the interference power generated into the adjacent cells 112, 113 or, alternatively, adjacent sectors. When, for a given loading, a feasible solution does not exist, base station 101 may choose the power and weighting allocations which maximizes the percentage of the loading that can be met by the base station.

In another embodiment of the present invention, an "independent optimization" embodiment, approximations can be used to allow the weighting coefficients for the various subscribers to be optimized independently. Instead of jointly optimizing (404) the weighting coefficients, base station 101 uses approximations (409) to determine an approximation of the joint optimization SNR expression. The approximations allow base station 101 to optimize (410) the weighting coefficients corresponding to each subscriber unit independent of the other subscriber units based on the approximation of the joint optimization SNR expression. Such an approach has an advantage of reducing the computational burden for base station 101 (although the computational burden placed on each subscriber units 105–107 may be slightly increased). Such an approach has a further advantage that independent optimization of the weighting coefficients utilized by base station 101 typically requires less uplink bandwidth for transmitting channel and interference information to the base station. If the optimal weighting coefficients are computed at the subscriber unit, only the weighting coefficients need be transmitted to the base station.

Base station 101, preferably processor 206 of base station 101, determines weighting coefficients corresponding to each subscriber unit 105–107 by optimizing weighting coefficients $w_{1,i}$ and $w_{2,i}$, respectively corresponding to multiple antenna array elements 121, 122 for the subscriber unit, wherein "i" is an index corresponding to the i-th subscriber unit for which the weighting coefficients are being optimized. Processor 206 optimizes the weighting coefficients corresponding to i-th subscriber unit by determining the weighting coefficients $w_{1,i}, w_{2,i}$ that maximize an SNR of an output of the matched filter Rake receiver of the subscriber unit, wherein the SNR is given by the following joint optimization expression of the SNR (wherein the index, i, is arbitrarily set to 1, corresponding to the first subscriber unit, for the purpose of illustrating the principles of the present invention), $$\left(\frac{E_s}{N_t}\right)_{MF,1} = \frac{N \frac{E_c}{I_{or}} \left| [w_{1,1}^* w_{2,1}^*] \begin{bmatrix} f_1^H \\ f_2^H \end{bmatrix} [f_1 f_2] \begin{bmatrix} w_{1,1} \\ w_{2,1} \end{bmatrix} \right|^2}{[w_{1,1}^* w_{2,1}^*] \begin{bmatrix} f_1^H \\ f_2^H \end{bmatrix} \left(\Omega_1(w_{1,1}w_{2,1}) + \Omega_2^k + \left(\frac{I_{or}}{I_{oc}}\right)^{-1} I_{M \times M}\right) [f_1 f_2] \begin{bmatrix} w_{1,1} \\ w_{2,1} \end{bmatrix}} \quad (1)$$

This equation is derived as follows.

Let the vectors $\tilde{f}_1$ and $\tilde{f}_2$ denote the respective propagation channels between the elements 121, 122 of antenna array 120 and the subscriber unit of interest (i.e., the i-th subscriber unit, or in the terminology of equation (1), the first subscriber unit). For notational simplicity, the impulse response of the channels will be assumed to be zero other than at integer multiples of the chip time, and thus the vector $\tilde{f}_i = \{\tilde{f}_{i,j}\}$ denotes the chip-spaced impulse response of the channel. Let K denote the number of communication channels occupied on the forward link, and let $\tilde{A} = \{\tilde{A}_i\}_{i=1}^K$ denote the set of amplitudes assigned to the communication, or spreading code, channels. For simplicity, the multiple subscriber units 105–107 are indexed such that the i-th Walsh code is assigned to the i-th subscriber unit.

Definitions related to the strength of intra-cell and inter-cell interference are simplified if the channels $\tilde{f}_1$ and $\tilde{f}_2$ and the amplitudes $\tilde{A}$ are normalized in the following manner. Let the channels $f_1$ and $f_2$ be defined as $$f_i = \tilde{f}_i \Big/ \left( \|\tilde{f}_1\|^2 + \|\tilde{f}_2\|^2 \right)^{1/2},$$

so that $$\|f_1\|^2 + \|f_2\|^2 = 1.$$

The propagation channels between each of the multiple elements 121, 122 and the subscriber unit of interest are not required to have equal energy. Similarly, define the normalized set of amplitudes $A = \{A_i\}_{i=1}^K$ such that $$A_i = \left( \tilde{A}_i \left( \|\tilde{f}_1\|^2 + \|\tilde{f}_2\|^2 \right) \right)^{1/2}.$$

Each of the K communication channels, or code channels, in system 100 is assigned a complex weighting coefficient corresponding to each antenna array element 121, 122. Assuming a two element antenna array 120, a pair of complex weighting coefficients $\{w_{1,i}, w_{2,i}\}$ is assigned to each of the K code channels. Each weighting vector is required to have unit energy, so that $$|w_{1,i}|^2 + |w_{2,i}|^2 = 1 \text{ for all } i.$$

Ideally, the weights $\{w_{1,i}, w_{2,i}\}$ applied to the i-th code channel are chosen in such a way as to maximize the SNR at the output of the matched-filter Rake receiver for the i-th subscriber unit. The total power transmitted by the serving base station, that is, base station 101, is given by $$\sum_{i=1}^K A_i^2 (|w_{1,i}|^2 + |w_{2,i}|^2) = \sum_{i=1}^K A_i^2,$$

and the total power received by the i-th subscriber unit from this base station, $\hat{I}_{or}$, is given by $$\hat{I}_{or} = \sum_{i=1}^K \tilde{A}_i^2 \left( \|w_{1,i} \tilde{f}_i + w_{2,i} \tilde{f}_2\|^2 \right)$$

$$= \sum_{i=1}^K A_i^2 \left( \|w_{1,i} f_i + w_{2,i} f_2\|^2 \right)$$

Due to the interaction of the weighting coefficients $\{w_{1,i}, w_{2,i}\}_{i=1}^{K}$ and the channels $f_1$ and $f_2$, the received signal power $\hat{I}_{or}$ at the i-th subscriber unit depends on the weighting coefficients. Thus, unless the amplitude $A_i$ is adjusted during the optimization of $\{w_{1,i}, w_{2,i}\}$, the intra-cell interference $\hat{I}_{or}$ will not be held constant at subscriber unit i. For this reason, a separate quantity $I_{or}$ is defined as $$I_{or} = \sum_{i=1}^{K} A_i^2.$$

Application of the Cauchy-Schwarz inequality then yields $$\hat{I}_{or} = \sum_{i=1}^{K} A_i^2 (\|w_{1,i} f_1 + w_{2,i} f_2\|^2) \le$$

$$\sum_{i=1}^{K} A_i^2 (|w_{1,i}|\|f_1\| + |w_{2,i}|\|f_2\|)^2 \le$$

$$\sum_{i=1}^{K} A_i^2 (|w_{1,i}|^2 + |w_{2,i}|^2)(\|f_1\|^2 + \|f_2\|^2)$$

$$= \sum_{i=1}^{K} A_i^2 = I_{or},$$

and thus, for the definitions used here, $\hat{I}_{or} \le I_{or}$. Also, it is apparent that $$\hat{I}_{or} \ge \min_{1 \le j \le K} \{\|w_{1,j} f_1 + w_{2,j} f_2\|^2\} \sum_{i=1}^{K} A_i^2 \ge$$

$$\inf\{\|\alpha f_1 + \beta f_2\| : |\alpha|^2 + |\beta|^2 = 1\} I_{or} = \gamma I_{or},$$

where $$\gamma = \{\|\alpha f_1 + \beta f_2\| : |\alpha|^2 + |\beta|^2 = 1\}.$$

Note that $\gamma > 0$ so long as the channels $f_1$ and $f_2$ are linearly independent.

The above inequalities are useful in developing expressions for the optimal transmit weighting coefficients in cases in which the interference is dominated alternately by intra-cell and inter-cell interference. Since the weighting coefficients affect the level of intra-cell signal power observed by the subscriber, $\hat{I}_{or}$, cannot be held constant during the optimization of $\{w_{1,i}, w_{2,i}\}$. However, with the above inequalities, the intra-cell interference observed by the i-th subscriber unit can be bounded above and below, so that $$\gamma I_{or} \le \hat{I}_{or} \le I_{or}.$$

Thus, a subscriber environment dominated by inter-cell interference $I_{oc}$ can be investigated by forcing or $I_{or}/I_{oc} \to 0$, since this implies that $\hat{I}_{or}/I_{oc} \to 0$. Similarly, a subscriber environment dominated by intra-cell interference can be investigated by forcing $I_{or}/I_{oc} \to \infty$, since this implies that $\hat{I}_{or}/I_{oc} \to \infty$.

The mean and variance of the multiple Rake fingers included in a Rake receiver must be evaluated in order to compute the SNR at the output of the matched-filter Rake receiver of each subscriber unit 105–107. Towards this end, again let the subscriber unit of interest have index 1, and as above, let the vectors $f_1$ and $f_2$ denote normalized propagation channels between elements 121 and 122, respectively, and the subscriber unit of interest. Without loss of generality, channels $f_1$ and $f_2$ are assumed to be zero outside of an interval of length M, so that $$f_{i,j} = 0 \text{ if } j \le 0 \text{ or } j > M.$$

Let the vector R denote the length-M vector of the outputs of the multiple Rake fingers of the subscriber unit. Let $\mu$ denote the mean vector of R, which has components given by $$\mu_l = E(R_l) = N A_1 (w_{1,1} f_{1,l} + w_{2,1} f_{2,l}).$$

where N is the number of chips per symbols. For random-orthogonal codes (Walsh codes with random spreading), the $M \times M$ correlation matrix $\Gamma_{l,m}$ has elements given by $$\Gamma_{l,m} = E(R_l R_m^*) =$$

$$N \sum_{j=1}^{K} A_j^2 \sum_{k \ne l} (w_{1,j} f_{1,k} + w_{2,j} f_{2,k})(w_{1,j} f_{1,m-l+k} + w_{2,j} f_{2,m-l+k})^* +$$

$$N^2 A_1^2 (w_{1,1} f_{1,1} + w_{2,1} f_{2,1})(w_{1,1} f_{1,m} + w_{2,1} f_{2,m})^* + N I_{oc} \varphi(m-1),$$

where $NI_{oc} \phi((m-l))$ is the covariance of the inter-cell interference and noise. The inter-cell interference is in general non-white because all of the CDMA signals from a given base station (an essentially white source) pass through a common channel en route to the subscriber unit. As a result, the inter-cell interference may be substantially non-white if dominated by a single base station. However, in order to simplify the analysis, the inter-cell interference is be assumed to be white, so that $$\varphi(k) = \begin{cases} 1 & k = 0 \\ 0 & \text{else} \end{cases},$$

where $I_{oc}$ denotes the power of the inter-cell interference. Let $\Omega$ denote the normalized covariance of the vector R, which is given by $$\Omega = E((R-\mu)(R-\mu)^*/N I_{or}) = (\Gamma - \mu \mu^*)/(N I_{or}),$$

and has components $$\Omega_{l,m} = I_{or}^{-1} \sum_{j=1}^{K} A_j^2 \sum_{k \ne l} (w_{1,j} f_{1,k} + w_{2,j} f_{2,k})(w_{1,j} f_{1,m-l+k} + w_{2,j} f_{2,m-l+k}) +$$

$$\frac{I_{oc}}{I_{or}} \varphi(m-l) =$$

$$I_{or}^{-1} \sum_{j=1}^{K} A_j^2 |w_{1,j}|^2 \sum_{k \ne l} f_{1,k} f_{1,m-l+k}^* + I_{or}^{-1} \sum_{j=1}^{K} A_j^2 |w_{2,j}|^2 \sum_{k \ne l} f_{2,k} f_{2,m-l+k}^* +$$

-continued $$2I_{or}^{-1}\text{Re}\left\{\sum_{j=1}^{K} A_j^2 w_{1,j} w_{2,j}^* \sum_{k \neq l} f_{1,k} f_{2,m-l+k}^*\right\} + \frac{I_{oc}}{I_{or}}\varphi(m-l) =$$

$$I_{or}^{-1}\left(\sum_{j=1}^{K} A_j^2\right)|w_{1,j}|^2 \Psi_{l,m}^{1,1} + I_{or}^{-1}\left(\sum_{j=1}^{K} A_j^2|w_{2,j}|^2\right)\Psi_{l,m}^{2,2} +$$

$$2I_{or}^{-1}\text{Re}\left\{\left(\sum_{j=1}^{K} A_j^2 w_{1,j} w_{2,j}\right)\Psi_{l,m}^{1,2}\right\} + \frac{I_{oc}}{I_{or}}\varphi(m-l),$$

where the matrix $\Psi^{i,j}$ has elements $$\Psi_{l,m}^{i,j} = \sum_{k \neq l} f_{1,k} f_{j,m-l+k}^* = \sum_{k} f_{i,k} f_{j,m-l+k}^* - f_{i,l} f_{j,m}^*.$$

It is useful to partition the covariance $\Omega$ into two parts, so that $$\Omega = \Omega_1 + \Omega_2^k,$$

where the first term $\Omega_1$ is the contribution of the signal of the subscriber unit of interest to the covariance, and the second term $\Omega_2^k$ is the contribution of all of the other subscriber units signals to the covariance. The SNR at the output of the matched filter Rake receiver of the subscriber unit of interest is given by $$\left(\frac{E_s}{N_t}\right)_{MF,1} = \frac{N\frac{E_c}{I_{or}}\left|[w_{1,1}^* w_{2,1}^*]\begin{bmatrix} f_1^H \\ f_2^H \end{bmatrix}[f_1 f_2]\begin{bmatrix} w_{1,1} \\ w_{2,1} \end{bmatrix}\right|^2}{[w_{1,1}^* w_{2,1}^*]\begin{bmatrix} f_1^H \\ f_2^H \end{bmatrix}\left(\Omega_1(w_{1,1}, w_{2,1}) + \Omega_2^k + \left(\frac{I_{or}}{I_{oc}}\right)^{-1}I_{M\times M}\right)[f_1 f_2]\begin{bmatrix} w_{1,1} \\ w_{2,1} \end{bmatrix}} \quad (1)$$

where the notation $\Omega_1(w_{1,1}, w_{2,1})$ has been used to denote the fact that $\Omega_1$ is a function of the weighting coefficients $\{w_{1,1}, w_{2,1}\}$.

The second term in middle term of the denominator of equation (1) can be approximated as $$\Omega_2 \approx \Omega_2^A = \frac{1}{2}\left(1 - \frac{E_c}{I_{or}}\right)(\Psi^{1,1} + \Psi^{2,2}) + \frac{I_{oc}}{I_{or}}\varphi(m-l). \quad (2)$$

With this approximation, the SNR for the subscriber unit of interest no longer depends on the weighting coefficients used for the other subscriber units. As a result, the weighting coefficients $w_{1,1}$, $w_{2,1}$ can be optimized independently so long as values of $E_c/I_{or}$ and $I_{or}/I_{oc}$ are known, wherein $E_c$ is a power or energy of a desired signal, $I_{or}$ is a power or energy of the intra-cell interference, and $I_{oc}$ is a power or energy of the inter-cell interference A value of $E_c/I_{or}$ can be estimated at a subscriber unit of itnerest, such as subscriber unit 105, or the value can be transmitted from base station 101 (where it is known) to the subscriber unit. A value of $I_{or}/I_{oc}$ can be estimated as follows. First, base station 101 is blanked for a brief interval so that $I_{oc}$ can be measured by the subscriber unit of interest, that is, subscriber unit 105. Subscriber unit 105 then measures the impulse response energy of signals received from each of the multiple array elements 121–122 (using a pilot signal allocated to each antenna) and transmits these energies back to base station 101. With these values, $I_{or}$ can be calculated by subscriber unit 105 in one of several ways. For example, subscriber unit 105 can transmit the energy values to base station 101 and the base station computes the value of $I_{or}$ and transmits the computed value back to the subscriber unit. By way of another example, base station 101 can transmit the weighting coefficients to subscriber unit 105 so that $I_{or}$ can be computed in the subscriber unit. In yet another example, subscriber unit 105 can compute the weighting coefficients for base station 101. Thus, subscriber unit 105 knows the weighting coefficients used by base station 101, and $I_{or}$ can be computed in the subscriber unit. Subscriber unit 105 then computes the ratio of $I_{or}/I_{oc}$ from the separate estimates of $I_{or}$ and $I_{oc}$.

In some instances, the approximation (equation (2) above)

$$\Omega_2 \approx \Omega_2^A = \frac{1}{2}\left(1 - \frac{E_c}{I_{or}}\right)(\Psi^{1,1} + \Psi^{2,2}) + \frac{I_{oc}}{I_{or}}\varphi(m-l).$$

can be simplified further. In one such embodiment of the present invention, for high-speed data, almost all of the power in the serving cell, or the serving sector when the cell is sectorized, may be allocated to the subscriber unit of interest (a single user, or "high allocation," embodiment) so that $E_c/I_{or}$ is approximately 1. In such an embodiment, the following approximation may be used:

$$\Omega_2 \approx \frac{I_{oc}}{I_{or}}\varphi(m-l). \quad (3)$$

In another such embodiment of the present invention, where the subscriber unit of interest is located in a "high geometry" environment, that is, when $I_{or}/I_{oc}$ is large, the following approximation may be used:

$$\Omega_2 \approx \frac{1}{2}\left(1 - \frac{E_c}{I_{or}}\right)(\Psi^{1,1} + \Psi^{2,2}). \quad (4)$$

Combinations of these two cases can be considered as well.

By using one of the above approximations, represented by equations (2), (3), and (4), the problem of jointly optimizing the weighting coefficients for all subscribers 105–107 in a cell 111 or a sector can be translated into a set of independent optimization problems, whereby the weighting coefficients for each of subscriber unit 105–107 are independently optimized. The complexity of the resulting independent optimization depends on the approximation being used. The optimization problem can also be simplified by using a low geometry approximation, for which $I_{or}/I_{oc}$ is approximately zero. However, since the low geometry approximation is infrequently applicable, the use of the other approximations yields more nearly optimal weighting coefficients.

The SNR expressions herein are given for a CDMA signal, transmitted from an antenna array 120, and received using a matched filter Rake receiver at a subscriber unit 105–107. Each set of weighting coefficients are designed to maximize the SNR at the output of a matched-filter (Rake) receiver in a corresponding subscriber unit 105–107. The SNR expressions yield the following results: (1) the SNR criteria which should be optimized in the selection of the weighting coefficients for antenna array 120 for each of subscriber units 105–107, (2) the fact that when self-interference is considered, the weighting coefficients for antenna array 120 for each of subscriber units 105–107 can be optimized jointly, (3) the set of information which must be fed back from the subscriber units 105–107 to base station 101 in order compute the jointly optimal array weighting coefficients, (4) the SNR behavior of a subscriber unit 105–107 in environments dominated by self-interference ("high geometry" environments), and (5) robust approximations to the SNR which can be optimized independently, rather than jointly.

Other optimization criteria can be defined which allow the subscriber units 105–107 to be optimized independently rather than jointly. For example, the full SNR expression represented by equation (1) could be used, but with the true covariance matrix $\Omega_2$ replaced by the approximation given by equation (2)

$$\Omega_2^A = \frac{1}{2}\left(1 - \frac{E_c}{I_{or}}\right)(\Psi^{1,1} + \Psi^{2,2}) + \frac{I_{oc}}{I_{or}}\varphi(m-l).$$

This approximation is equal to $\Omega_2$ when half of the output signal power of the serving base station, that is base station 101, is transmitted over each of the two elements 121, 122 of antenna array 120 and when the weighting vectors are randomly oriented so that $$\sum_{i=2}^{K} w_{1,i} w_{2,i}^* = 0.$$

Since the expression does not depend on the transmit coefficients of the subscribers, each subscriber unit's weighting coefficients can be optimized independently from the other subscriber units.

Since optimization of weighting coefficients is difficult due to the complexity of the SNR expression represented by equation (1), some special and limiting cases exist where optimization of the weighting coefficients is somewhat simpler. One such special case is when inter-cell interference is dominant. A propagation environment where inter-cell interference is dominant can be represented by forcing the ratio of intra-cell to inter-cell interference $\hat{I}_{or}/I_{oc}$ to zero, that is, by setting $\hat{I}_{or}/I_{oc}$ equal to zero. Thus, in the limit as $\hat{I}_{or}/I_{oc} \to 0$, the SNR at the output of the matched filter Rake receiver of the subscriber unit of interest is given by $$\left(\frac{E_s}{N_t}\right)_{MF,1} = N \frac{E_c}{I_{oc}} \left( [w_{1,1}^* w_{2,1}^*] \begin{bmatrix} f_1^H \\ f_2^H \end{bmatrix} [f_1 f_2] \begin{bmatrix} w_{1,1} \\ w_{2,1} \end{bmatrix} \right). \quad (6)$$

Equation (6), corresponding to the SNR in the absence of intra-cell interference, is an expression of SNR of a subscriber unit 105–107 that is optimized in the prior art TxAA system. The optimal weighting vector $\{w_{1,1}, w_{2,1}\}$ in this environment is equal to the eigenvector, $v_{max}$, corresponding to the largest eigenvalue, $\lambda_{max}$, of the matrix $$\begin{bmatrix} f_1^H \\ f_2^H \end{bmatrix} [f_1 f_2]. \quad (7)$$

Because this matrix does not depend on the weighting coefficients of the other channels, there is no interaction between the weighting coefficient optimizations performed by the individual subscriber units 105–107.

With the optimal transmit weighting vector, the SNR at the output of the matched filter Rake receiver of a subscriber unit of interest is given by $$\left(\frac{E_s}{N_t}\right)_{MF,1} = N \frac{E_c}{I_{oc}} \lambda_{max} \quad (8)$$

A second special and limiting case where optimization of the weighting coefficients is somewhat simpler is the case where intra-cell interference is dominant. Environments in which the ratio $\hat{I}_{or}/I_{oc}$ is large are sometimes referred to as "high geometry" environments. In high geometry environments, intra-cell interference is the dominant source of interference when the channel has significant multipath fading. As noted above, if the channels $f_1$ and $f_2$ are linearly independent, the limiting behavior of transmit antenna array weighting as $\hat{I}_{or}/I_{oc}$ becomes large can be evaluated by forcing the ratio $\hat{I}_{or}/I_{oc}$ to infinite. Thus, in the limit as $\hat{I}_{or}/I_{oc} \to \infty$, the SNR at the output of the matched filter Rake receiver of the subscriber unit of interest is given by $$\left(\frac{E_s}{N_t}\right)_{MF,1} = \frac{N\frac{E_c}{I_{or}}\left([w_{1,1}^* w_{2,1}^*]\begin{bmatrix} f_1^H \\ f_2^H \end{bmatrix}[f_1 f_2]\begin{bmatrix} w_{1,1} \\ w_{2,1} \end{bmatrix}\right)^2}{[w_{1,1}^* w_{2,1}^*]\begin{bmatrix} f_1^H \\ f_2^H \end{bmatrix}(\Omega_1(w_{1,1}, w_{2,1}) + \Omega_2^k)[f_1 f_2]\begin{bmatrix} w_{1,1} \\ w_{2,1} \end{bmatrix}} \quad (9)$$

Due to the dependence of the matrix $\Omega$ on $\{w_{1,1}, w_{2,1}\}$, no direct method exists for finding the optimal transmit weighting vector, and thus, in general, a search of the space $$(\{w_{1,1}, w_{2,1}\}: |w_{1,1}|^2 + |w_{2,1}|^2 = 1). \quad (10)$$

is required to determine the optimal weighting vector.

A third special and limiting case where optimization of the weighting coefficients is somewhat simpler is the case where the power allocated to the communication channel of interest is a reasonably small fraction of the total power transmitted by the serving base station, that is base station 101. That is to say, $$\frac{E_c}{I_{or}} = \frac{A_1^2}{\sum_{i=1}^{K} A_i^2} \ll 1. \quad (11)$$

In this environment, it can reasonably be argued that $$\Omega = \Omega_1(w_{1,1}, w_{2,1}) + \Omega_2^k \approx \Omega_2^k, \quad (12)$$

so that $\Omega$ is approximately independent of $\{w_{1,1}, w_{2,1}\}$. With this approximation, the SNR at the output of the matched filter Rake receiver of the subscriber unit of interest becomes $$\left(\frac{E_s}{N_t}\right)_{MF,1} = \frac{N\frac{E_c}{I_{or}}\left([\,w_{1,1}^*\ w_{2,1}^*\,]\begin{bmatrix}f_1^H\\f_2^H\end{bmatrix}[\,f_1\ f_2\,]\begin{bmatrix}w_{1,1}\\w_{2,1}\end{bmatrix}\right)^2}{[\,w_{1,1}^*\ w_{2,1}^*\,]\Phi\begin{bmatrix}w_{1,1}\\w_{2,1}\end{bmatrix}}, \quad (13)$$

where $$\Phi = \begin{bmatrix}f_1^H\\f_2^H\end{bmatrix}(\Omega_2^k + (I_{or}/I_{oc})^{-1}I_{M\times M})[f_1 f_2]. \quad (14)$$

The symmetric positive semi-definite matrix $\Phi$ has a unique symmetric positive semi-definite square root $\Lambda$, such that $$\Phi = \Lambda\Lambda.$$

If the positive semi-definite matrix $\Lambda$ is positive definite, then $\Lambda$ will have a uniquely defined inverse $\Lambda^{-1}$. Let w denote the vector $\{w_{1,1}, w_{2,1}\}$ and define the vector y such that $$y = \Lambda w.$$

With these definitions, it follows that $$\left(\frac{E_s}{N_t}\right)_{MF,1} = \frac{N\frac{E_c}{I_{or}}\left(y^*(\Lambda^{-1})^*\begin{bmatrix}f_1^H\\f_2^H\end{bmatrix}[\,f_1\ f_2\,]\Lambda^{-1}y\right)^2}{\|y\|^2}$$

$$\leq \frac{N\frac{E_c}{I_{or}}(\lambda_{max}\|y\|^2)^2}{\|y\|^2}$$

$$= N\frac{E_c}{I_{or}}\lambda_{max}^2\|y\|^2. \quad (15)$$

The upper bound in the above expression is met only if $$y = \alpha v_{max},$$

for some complex scalar $\alpha$, where $v_{max}$ is the eigenvector corresponding to the largest eigenvalue, $\lambda_{max}$, of the matrix $$(\Lambda^{-1})^*\begin{bmatrix}f_1^H\\f_2^H\end{bmatrix}[\,f_1\ f_2\,]\Lambda^{-1}. \quad (16)$$

The optimal weighting unit-energy transmit weighting vector is thus given by $$w_1 = \frac{\Lambda^{-1}\alpha v_{max}}{\|\Lambda^{-1}\alpha v_{max}\|} = \frac{\Lambda^{-1}v_{max}}{\|\Lambda^{-1}v_{max}\|} \quad (17)$$

and the resulting signal-to-noise ratio is given by $$\left(\frac{E_s}{N_t}\right)_{MF,1} = N\frac{E_c}{I_{or}}\lambda_{max}^2\frac{\|v_{max}\|^2}{\|\Lambda^{-1}v_{max}\|^2}. \quad (18)$$

As noted above, the optimal weighting vector depends on the weightings $\{w_{1,i}, w_{2,i}\}_{i=2}^{K}$, which may change simultaneously with the application of the newly calculated optimal weighting vector $\{w_{1,1}, w_{2,1}\}$. The new vector $\{w_{1,1}, w_{2,1}\}$ will only be optimal if the weighting vectors of the other channels remain constant.

A fourth special and limiting case where optimization of the weighting coefficients is somewhat simpler is the case where a cell includes only the subscriber unit of interest, that is, a single subscriber unit environment. In such a case, the SNR at the output of the matched filter Rake receiver of the subscriber unit of interest is given by $$\left(\frac{E_s}{N_t}\right)_{MF,1} = \frac{N\left([w_{1,1}^* w_{2,1}^*]\begin{bmatrix}f_1^H\\f_2^H\end{bmatrix}[f_1 f_2]\begin{bmatrix}w_{1,1}\\w_{2,1}\end{bmatrix}\right)^2}{[w_{1,1}^* w_{2,1}^*]\begin{bmatrix}f_1^H\\f_2^H\end{bmatrix}\left(\begin{array}{c}|w_{1,1}|^2\Psi^{1,1}+|w_{2,1}|^2\Psi^{2,2}+\\2Re\{w_{1,1}w_{2,1}^*\Psi^{1,2}\}+(I_{or}/I_{oc})^{-1}I_{M\times M}\end{array}\right)[f_1 f_2]\begin{bmatrix}w_{1,1}\\w_{2,1}\end{bmatrix}}, \quad (19)$$

where the matrices $\Psi^{1,1}$, $\Psi^{1,2}$, and $\Psi^{2,2}$ have been defined above.

In a single subscriber unit environment in which intra-cell interference is dominant, so that $I_{or}/I_{oc} \to \infty$, the signal-to-noise ratio expression is given by $$\left(\frac{E_s}{N_t}\right)_{MF,1} = \frac{N\left([w_{1,1}^* w_{2,1}^*]\begin{bmatrix}f_1^H\\f_2^H\end{bmatrix}[f_1 f_2]\begin{bmatrix}w_{1,1}\\w_{2,1}\end{bmatrix}\right)^2}{[w_{1,1}^* w_{2,1}^*]\begin{bmatrix}f_1^H\\f_2^H\end{bmatrix}(|w_{1,1}|^2\Psi^{1,1}+|w_{2,2}|^2\Psi^{2,2}+2Re\{w_{1,1}w_{2,1}^*\Psi^{1,2}\})[f_1 f_2]\begin{bmatrix}w_{1,1}\\w_{2,1}\end{bmatrix}}, \quad (20)$$

The optimal vector of weighting coefficients for the above can be shown to be equivalent to the weighting vector which maximizes the ratio $$\left(\frac{E_s}{N_t}\right)_{MF,1} = \frac{(\|w_{1,1}f_1+w_{2,1}f_2\|^2)^2}{\|(w_{1,1}f_1+w_{2,1}f_2)\otimes(w_{1,1}f_1+w_{2,1}f_2)^{TR*}\|^2}, \quad (21)$$

where $\otimes$ has been used to denote convolution, and TR* has been used to denote the time reverse conjugate of the given vector. In general, a search will be required to determine the optimal transmitter weighting coefficients.

A simple example demonstrates the effect of intra-cell interference on communication system 100. In this example, the performance of a transmitting communication device antenna array utilizing prior art transmitting antenna array weighting (TxAA) is compared to optimized transmitting antenna array weighting determined in accordance with the present invention and to selection transmit diversity (STD) weighting. Let the channel impulse responses $f_1$ and $f_2$ have length 2 and be given by $$f_1 = \{1, 0\}$$

$$f_2 = \{1/\sqrt{2}, 1/\sqrt{2}\}$$

The TxAA weighting vector is proportional to the eigenvector corresponding to the largest eigenvector of the matrix $$\begin{bmatrix} f_1^H \\ f_2^H \end{bmatrix} [f_1 \quad f_2] = \begin{bmatrix} 1 & 1/\sqrt{2} \\ 1/\sqrt{2} & 1 \end{bmatrix}.$$

This matrix has eigenvalues and eigenvectors given by $$\text{eigenvalues } \begin{aligned} \lambda_1 &= 1 + \sqrt{2} \\ \lambda_2 &= 1 - \sqrt{2} \end{aligned} \quad \text{eigenvectors } \begin{aligned} e_1^T &= [1 \quad 1] \\ e_2^T &= [1 \quad -1] \end{aligned}.$$

Thus, the normalized TxAA vector $w_{AA}$ of weighting coefficients is given by $$w_{AA} = \begin{bmatrix} 1/\sqrt{2} \\ 1/\sqrt{2} \end{bmatrix}.$$

In selection transmit diversity (STD), all of the transmitter power is allocated to one or the other of the antennas. The selection diversity weighting chosen here will allocate all of the transmitter power to the first antenna, so that a normalized STD vector $w_{STD}$ of weighting coefficients is given by $$w_{STD} = \begin{bmatrix} 1 \\ 0 \end{bmatrix}.$$

Reference to equation (1) as well as to the definition of $\Omega$ indicates that the following parameters must be known in order to evaluate the performance of the vector w, of weighting coefficients for a subscriber unit of interest: $E_c/I_{or}$, $I_{oc}/I_{or}$, as well as the quantities $$a_1 = I_{or}^{-1} \left( \sum_{j=2}^{K} A_j^2 |w_{1,j}|^2 \right),$$

$$a_2 = I_{or}^{-1} \left( \sum_{j=2}^{K} A_j^2 |w_{2,j}|^2 \right), \text{ and}$$

-continued $$a_3 = 2 I_{or}^{-1} \sum_{j=2}^{K} A_j^2 w_{1,j} w_{2,j}^*.$$

For the purposes of this example, it will be assumed that half of the total power allocate for code channels 2 through K is transmitted over each of the two antennas, so that $$\alpha_1 = \alpha_2 = 1.$$

Without loss of generality, the coefficient $w_{1,j}$ can be assumed to have zero phase. If the weighting coefficients $\{w^{2,j}\}_{j=2}^{K}$ are randomly oriented with respect to each other, then the mean value of $\alpha_3$ will be zero. Thus, for the purposes of this example, it will be assumed that $\alpha_3 = 0$.

With the above assumptions, the signal-to-noise ratio of TxAA is given by $$\left(\frac{E_s}{N_t}\right)_{MF,TxAA} = \frac{N \frac{E_c}{I_{or}} (1 + 1/\sqrt{2})^2}{\frac{1}{4}\left(\frac{3}{2} + \frac{1}{\sqrt{2}}\right) + \frac{1}{4\sqrt{2}} \frac{E_c}{I_{or}} + (1 + 1/\sqrt{2}) \frac{I_{oc}}{I_{or}}},$$

and the signal-to-noise ratio for selection transmit diversity (STD) is given by $$\left(\frac{E_s}{N_t}\right)_{MF,STD} = \frac{N E_c / I_{or}}{\frac{1}{4}(1 - E_c/I_{or}) + I_{oc}/I_{or}}.$$

Thus, the relative performance of TxAA and STD is given by $$\left(\left(\frac{E_s}{N_t}\right)_{MF,TxAA} \Big/ \left(\frac{E_s}{N_t}\right)_{MF,STD}\right) = \frac{0.729(1 - E_c/I_{or}) + 2.91(I_{oc}/I_{or})}{0.552 + 0.177(E_c/I_{or}) + 1.71(I_{oc}/I_{or})}.$$

From this expression, it is apparent that as $I_{or}/I_{oc} \to 0$, the performance of TxAA is 2.3 dB better than the performance of STD. Relative to STD, the largest gain achievable with the TxAA (on a static channel) is 3 dB, and such gain is achievable only if the two channels have equal energy. Thus, in this sense, the example chosen here can be considered to be a good example for demonstrating the benefits of TxAA. However, in the limit as or $I_{or}/I_{oc} \to \infty$, the relative performance of TxAA and STD is given by $$\left(\left(\frac{E_s}{N_t}\right)_{MF,TxAA} \Big/ \left(\frac{E_s}{N_t}\right)_{MF,STD}\right) = \frac{0.729(1 - E_c/I_{or})}{0.552 + 0.177(E_c/I_{or})}.$$

FIG. 5 is a table 500 comparing the SNR at the output of the matched-filter receiver for a signal received from a transmitting communication device employing a TxAA coefficient weighting system and for a transmitting communication device employing an STD system as a function of $I_{oc}/I_{or}$ and $E_c/I_{or}$. As can be seen in FIG. 4, for this example, STD performs better than TxAA if the intra-cell energy is dominant and subscriber of interest is allocated a sufficiently large fraction of the transmitted power. Such conditions may occur in data applications for which a single high-speed subscriber is allocated the majority of the power transmitted by the base station. FIG. 6 is a table 600 comparing the output of the matched-filter receiver for a signal received from a transmitting communication device employing a TxAA coefficient weighting system and for a transmitting communication device employing optimized transmitting antenna array weighting determined in accordance with an embodiment of the present invention. The gains of the optimized weighting of the present invention can be quite large if intra-cell interference dominates inter-cell interference and if $E_c/I_{or}$ is large.

In sum, a serving base station (i.e., base station 101) that includes a multiple element antenna array optimizes weighting coefficients that are applied to transmissions to each subscriber unit 105–107 serviced by the base station by determining the weighting coefficients that maximize an expression (equation (1)) for the exact SNR of the forward link (base station-to-subscriber unit) of the base station and the subscriber unit. This expression illustrates that the interference observed by each subscriber unit 105–107 depends on both $I_{or}/I_{oc}$ and the transmit weighting coefficients $\{w_{1,i}, w_{2,i}\}_{i=1}^{K}$ applied to each of the subscriber units. Due to this dependence, one subscriber unit cannot optimize its transmit weighting coefficients for the next time interval without knowledge of the weighting coefficients of each of the other subscriber units in the future time interval. Thus, full optimization of the weighting coefficients is a joint, rather than an independent venture. Joint optimization preferably is implemented at serving base station 101 and is based on the base stations knowledge of the channels between itself and each of its subscribers, as well knowledge of the ratio $I_{or}/I_{oc}$ observed at each of the subscribers. This information could be transmitted from each of the subscribers to the base station via a reverse link.

Due to its complexity, joint optimization of the weighting coefficients may have limited applicability. However, optimization criteria can be defined which allow the subscribers to be optimized independently rather than jointly. For example, more nearly optimal weighting coefficients can be computed by substituting the average interference covariance matrix into the expression for the SNR. Since the average interference covariance matrix does not depend on the transmit coefficients of the subscribers, each subscriber can be optimized independently from the others. Because this method accounts for self-interference, it yields a weighting that is more nearly optimal than the current methods of transmit antenna array weighting The exact SNR analysis was also used to demonstrate that the current methods of transmit weighting are only optimal in the limit as $I_{or}/I_{oc} \to 0$. In contrast, in high geometry environments for which $I_{or}/I_{oc}$ large, examples can be constructed for which the the current methods of weighting perform much worse than the simpler selection transmit diversity (STD). Furthermore, the gains predicted from the current methods of transmit weighting with $I_{or}/I_{oc}=0$ may be significantly be reduced when $I_{or}/I_{oc}$ is large.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for antenna beamforming in a communication system comprising a plurality of subscriber units and a transmitting communication device having an antenna array comprised of a plurality of array elements, the method comprising a step of jointly optimizing a plurality of weighting coefficients to produce a plurality of optimized weighting coefficients for use by the transmitting communication device in transmissions to the plurality of subscriber units, wherein each subscriber unit of the plurality of subscriber units is associated with a different beam of a plurality of beams and wherein each optimized weighting coefficient of the plurality of optimized weighting coefficients is associated with an element of the plurality of elements and is further associated with a subscriber unit of the plurality of subscriber units.

2. The method of claim 1, further comprising steps of:
   modulating a plurality of signals to produce a plurality of modulated signals, wherein each signal of the plurality of signals is modulated based on an optimized weighting coefficient of the plurality of optimized weighting coefficients;
   transmitting each modulated signal of the plurality of modulated signals via an array element of the plurality of array elements.

3. The method of claim 1, wherein the step of jointly optimizing a plurality of weighting coefficients comprises a step of determining values for the plurality of weighting coefficients that jointly maximize a signal-to-noise ratio for each subscriber unit of the plurality of subscriber units.

4. The method of claim 1, wherein the step of jointly optimizing a plurality of weighting coefficients comprises a step of jointly optimizing a plurality of weighting coefficients based on information concerning a plurality of propagation channels and an autocorrelation of background interference and wherein each propagation channel of the plurality of propagation channels is a propagation channel between a subscriber unit of the plurality of subscriber units and an array element of the plurality of array elements.

5. A method for antenna beamforming in a communication system comprising a plurality of subscriber units and a transmitting communication device having an antenna array comprised of a plurality of array elements, the method comprising steps of:
   approximating one or more terms in an expression which jointly optimizes a signal-to-noise ratio (SNR) for the plurality of subscriber units to produce an approximation of the joint optimization expression of an SNR; and
   independently optimizing a set of weighting coefficients of a plurality of sets of weighting coefficients based on the approximation of the joint optimization expression of an SNR to produce a set of optimized weighting coefficients, wherein each set of optimized weighting coefficients of the plurality of sets of optimized weighting coefficients corresponds to, and is utilized for a transmission to, a subscriber unit of the plurality of subscriber units and wherein each subscriber unit of the plurality of subscriber units is associated with a different beam of a plurality of beams.

6. The method of claim 5, wherein each optimized weighting coefficient in a set of optimized weighting coefficients corresponds to an array element of the plurality of array elements and wherein the method further comprises steps of:

modulating a plurality of signals to produce a plurality of modulated signals, wherein each signal of the plurality of signals is modulated based on an optimized weighting coefficient of the set of optimized weighting coefficients;

transmitting each modulated signal of the plurality of modulated signals via an array element of the plurality of array elements.

7. The method of claim 5, wherein each subscriber unit of the plurality of subscriber units comprises a Rake receiver, wherein a covariance of en output of the Rake receiver of each subscriber unit comprises a contribution to the covariance by the other subscriber units of the plurality of subscriber units, wherein the step of approximating one or more terms in a joint optimization expression of an SNR comprises a step of approximating the covariance of an output of the Rake receiver of each subscriber unit with a contribution to the covariance by the other subscriber units.

8. The method of claim 5, wherein the transmitting communication device operates in an environment where inter-cell interference dominates intra-cell interference, wherein the step of approximating one or more terms in a joint optimization expression of an SNR comprises a step of assuming that the ratio of intra-cell interference to inter-cell interference is equal to zero.

9. The method of claim 5, wherein the transmitting communication device operates in an environment where intra-cell interference dominates inter-cell interference, wherein the step of approximating one or more terms in a joint optimization expression of an SNR comprises a step of assuming a high geometry propagation environment.

10. The method of claim 5, wherein the communication system further comprises a plurality of communication channels, wherein each communication channel of the plurality of communication channels is allocated to a subscriber unit of the plurality of subscriber units, wherein each subscriber unit of the plurality of subscriber units comprises a Rake receiver, wherein a covariance of an output of the Rake receiver of each subscriber unit comprises a contribution to the covariance by the other subscriber units of the plurality of subscriber units, wherein the step of approximating one or more terms in a joint optimization expression of an SNR comprises a step of assuming that the covariance is equal to the contribution to the covariance by the other subscriber units of the plurality of subscriber units.

11. In a communication system comprising a plurality of subscriber units, a transmitting communication device comprising:

an antenna array comprising a plurality of may elements;

a plurality of weighters, wherein each weighter of the plurality of weighters is coupled to an element of the plurality of elements; and a processor coupled to each weighter of the plurality of weighters, wherein the processor jointly optimizes a plurality of weighting coefficients for use in transmissions to the plurality of subscriber units and wherein each weighting coefficient of the plurality of weighting coefficients is associated wit an element of the plurality of elements and is further associated with a subscriber unit of the plurality of subscriber units and wherein each subscriber unit of the plurality of subscriber units is associated with a different beam of a plurality of beams.

12. The communication device of claim 11, wherein when the communication device transmits data to a subscriber unit of the plurality of subscriber units, the processor provides to each weigher of the plurality of weighters the weighting coefficient associated with the subscriber unit and with the element coupled to the weighter, and wherein each weighter then modulates a signal based on the weighting coefficient received from the processor.

13. The communication device of claim 11, wherein the processor jointly optimizes a plurality of weighting coefficients by determining values for the plurality of weighting coefficients that jointly maximize a signal-to-noise ratio for each subscriber unit.

14. The communication device of claim 11, wherein the processor jointly optimizes a plurality of weighting coefficients based on information concerning a plurality of propagation channels and an autocorrelation of background interference and wherein each propagation channel of the plurality of propagation channels is a propagation channel between a subscriber unit of the plurality of subscriber units and an array element of the plurality of array elements.

15. In a communication system comprising a plurality of subscriber units, a transmitting communication device comprising:

an antenna array comprising a plurality of array elements;

a plurality of weighters, wherein each weighter of the plurality of weighters is coupled to an element of the plurality of elements; and a processor coupled to each weighter of the plurality of weighters, wherein the processor approximates one or more terms in an expression which jointly optimizes a signal-to-noise ratio (SNR) for the plurality of subscriber units to produce an approximation of the joint optimization expression of an SNR and independently optimizes a set of weighting coefficients of a plurality of sets of weighting coefficients based on the approximation of the joint optimization expression of an SNR to produce a set of optimized weighting coefficients, wherein each set of optimized weighting coefficients of the plurality of sets of optimized weighting coefficients corresponds to, and are utilized for transmissions to, a subscriber unit of the plurality of subscriber units and wherein each subscriber unit of the plurality of subscriber units is associated with a different beam of a plurality of beams.

16. The communication device of claim 15, wherein each optimized weighting coefficient in a set of optimized weighting coefficients corresponds to an array element of the plurality of array elements, wherein when the communication device transmits data to a subscriber unit of the plurality of subscriber units, the processor provides to each weighter of the plurality of weighters an optimized weighting coefficient associated with the subscriber unit and with the element coupled to the weighter, and wherein each weighter ten modulates a signal based on the weighting coefficient received from the processor.

17. The communication device of claim 15, wherein each subscriber unit of the plurality of subscriber units comprises a Rake receiver, wherein a covariance of an output of the Rake receiver of each subscriber unit comprises a contribution to the covariance by the other subscriber units of the plurality of subscriber units, wherein the processor approximates one or more terms in a joint optimization expression of a signal-to-noise ratio (SNR) by approximating the covariance to be equal to the contribution to the covariance by the other subscriber units.

18. The communication device of claim 17, wherein the approximation of the contribution to the covariance by the other subscriber units comprises the equation $$\Omega_2 \approx \Omega_2^A = \frac{1}{2}\left(1 - \frac{E_c}{I_{or}}\right)(\Psi^{1,1} + \Psi^{2,2}) + \frac{I_{oc}}{I_{or}}\varphi(m-l).$$

19. The communication device of claim 17, wherein the approximation of the contribution to the covariance by the other subscriber units comprises the equation $$\Omega_2 \approx \frac{I_{oc}}{I_{or}\varphi(m-l)}.$$

20. The communication device of claim 17, wherein the approximation of the contribution to the covariance by the other subscriber units comprises the equation $$\Omega_2 \approx \frac{1}{2}\left(1 - \frac{E_c}{I_{or}}\right)(\Psi^{1,1} + \Psi^{2,2}).$$

21. The communication device of claim 15, wherein the communication device operates in an environment where inter-cell interference dominates intra-cell interference, wherein the processor approximates one or more terms in a joint optimization expression of a signal-to-noise ratio (SNR) by assuming that the ratio of intra-cell interference to inter-cell interference is equal to zero.

22. The communication device of claim 15, wherein the communication device operates in an environment where intra-cell interference dominates inter-cell interference, wherein the processor approximates one or more terms in a joint optimization expression of a signal-to-noise ratio (SNR) by assuming a high geometry propagation environment.

23. The communication device of claim 15, wherein the communication system further comprises a plurality of communication channels, wherein each communication channel of the plurality of communication channels is allocated to a subscriber unit of the plurality of subscriber units, wherein each subscriber unit of the plurality of subscriber units comprises a Rake receiver, wherein a covariance of an output of the Rake receiver of each subscriber unit comprises a contribution to the covariance by the other subscriber units of the plurality of subscriber units, wherein the processor approximates one or more terms in a joint optimization expression of a signal-to-noise ratio (SNR) by assuming that the covariance is equal to the contribution to the covariance by the other subscriber units of the plurality of subscriber units.

* * * * *